Figure 5:
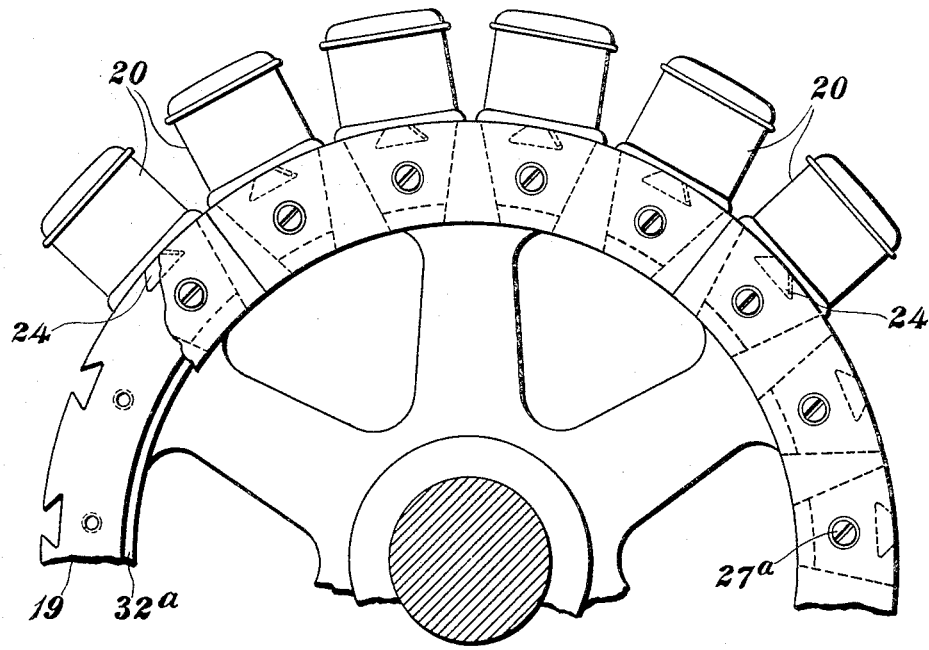

B. A. BEHREND & E. MATTMAN.
DYNAMO ELECTRIC MACHINE.
APPLICATION FILED MAR. 31, 1906.
923,615.
Patented June 1, 1909.
2 SHEETS—SHEET 1.
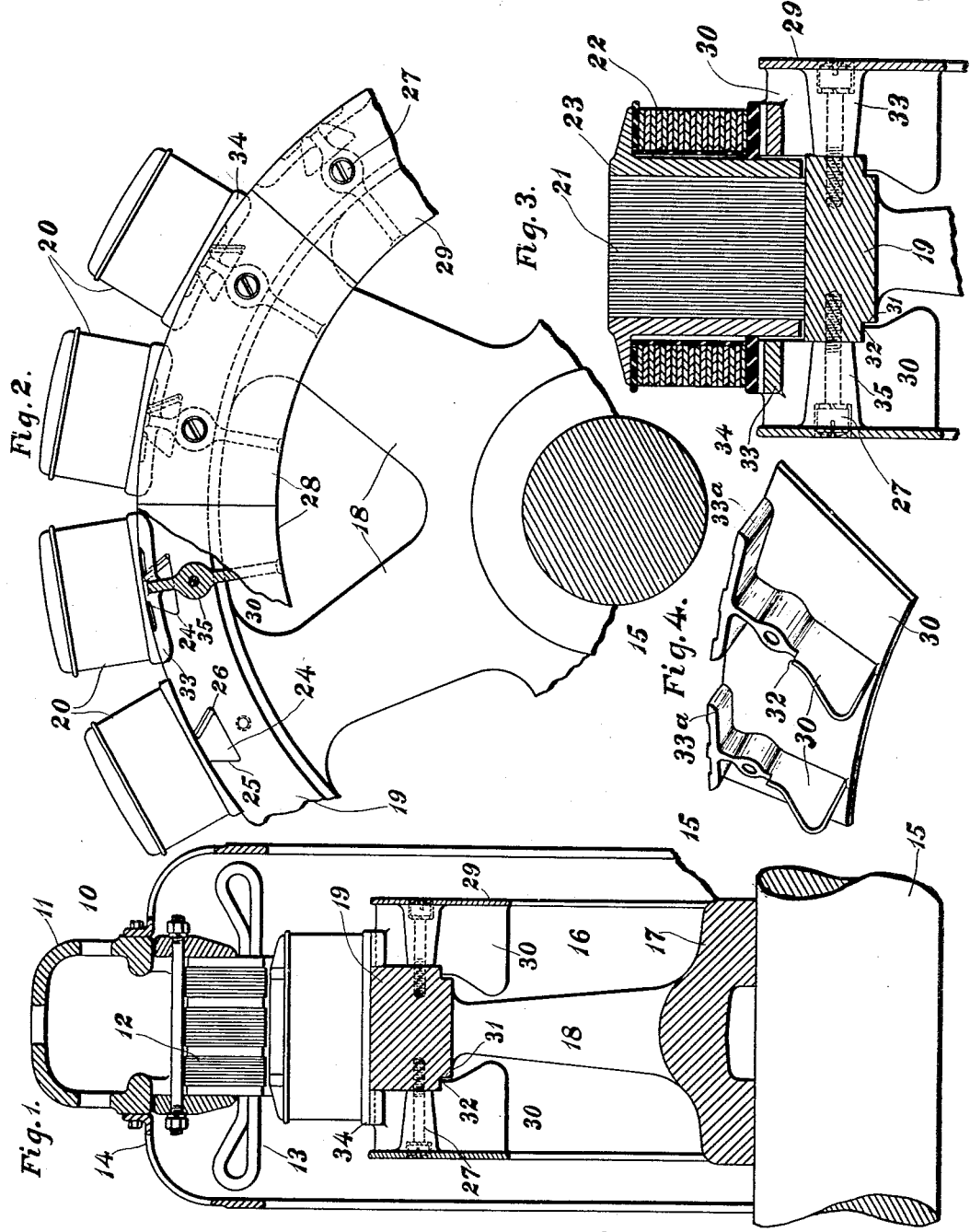
WITNESSES
Oliver W. Sharman
Fred J. Kinsey
INVENTORS
Bernard A. Behrend
Emil Mattman
BY
Chas. E. Lord
ATTORNEY B. A. BEHREND & E. MATTMAN.
DYNAMO ELECTRIC MACHINE.
APPLICATION FILED MAR. 31, 1906.

923,615.

Patented June 1, 1909.

2 SHEETS—SHEET 2.

WITNESSES
Oliver W. Sharman
Fred J. Kinney

INVENTORS
Bernard A. Behrend
Emil Mattman
BY
Chas. E. Lord
ATTORNEY

UNITED STATES PATENT OFFICE.

BERNARD A. BEHREND AND EMIL MATTMAN, OF NORWOOD, OHIO, ASSIGNORS TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 923,615.  Specification of Letters Patent.  Patented June 1, 1909.

Application filed March 31, 1906. Serial No. 309,046.

*To all whom it may concern:*

Be it known that we, BERNARD A. BEHREND and EMIL MATTMAN, citizens of the United States and of the Republic of Switzerland, respectively, residing at Norwood, in the county of Hamilton and State of Ohio, have invented certain new and useful Improvements in Dynamo-Electric Machines, of which the following is a full, clear, and exact specification.

Our invention relates to dynamo-electric machines and particularly to the rotary field members.

Rotary field members as commonly constructed consist of a spider secured to a shaft, and radial outwardly extending field-magnets secured to the rim of the spider by some means, as by dove-tail joints or connections, or by bolts passing through the rim. When secured to the rim by the first named method the magnets are provided with dove-tail projections which engage corresponding under-cut grooves in the spider and are held firmly in position by lateral, tightly fitting wedges or keys. To prevent accidental movement or displacement of the wedges or keys, and the consequent loosening of the field magnets, cast or wrought-iron rings are usually bolted to the sides of the rim. The rim proper of the spider is usually no wider than the poles of the magnets, so that the ends of the coils overhang the rim and are supported on the outer peripheries of rings secured to the sides of the rim.

In machines of ordinary size and capacity, the stator coils are cooled by the fan-like action of the rotating field-magnets. In machines in which the iron and copper losses are considerable, a sufficient amount of air can not always be supplied to the stator by the field-magnets. It has been proposed to secure fan-blades to the sides of the rim and to the rings secured to the sides of the rim, for increasing the amount of air supplied to the stator. This construction increases the weight and the number of parts of the rotor. As the peripheral speed of the rotor is usually very high, it is seen that the rotor should consist of as few parts as possible and should be as light as is consistent with strength and safety.

In carrying out our invention, we dispense with the usual key or wedge-holding and coil-supporting rings and employ for the same purpose the ventilating members, which in the preferred form of our invention consists of fan segments secured to the sides of the rim. With this construction a much lighter, cheaper and safer structure is obtained, and the ventilation is materially improved.

More specifically considered, our invention consists in a rotary field-member comprising a spider having a rim, field magnets dove-tailed to the rim, and segmental ventilating members secured to each side of the rim, each segment having one or more inwardly extending radial fan-blades arranged opposite the field-magnets and having portions which engage the sides of the rim and the outwardly projecting portions of the coils or coil-seats, whereby the blades not only create air-currents, but also hold the field-magnets and holding-wedges or keys in position, and support the end-portions of the coils which extend beyond the rim.

Our invention still further consists in the details of construction, the combinations of elements, and in the arrangements of parts described in the specification and set forth in the appended claims.

For a better understanding of our invention, reference is had to the accompanying drawings in which—

Figure 6:
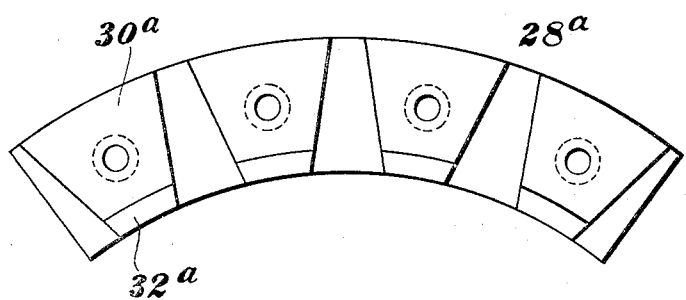

Figure 1 is a partial vertical section through the stationary armature and rotary field-member of the machine, parts being broken away; Fig. 2 is a partial elevation of the rotary field-member, parts being broken away for the sake of clearness, and the shaft being in section; Fig. 3 is a section of the outer portion of the rotary field-member, the section being taken through the dovetail projection of the field-magnet and the rim of the spider; Fig. 4 is a perspective view of a slightly modified form of the segment; Fig. 5 is a view similar to Fig. 2, of a further slight modification; and Fig. 6 is a slightly enlarged elevation of one of the segments employed in the modification shown in Fig. 5.

Referring now to the figures of the drawing we have shown at 10 the stator of the machine, which in this case is the stationary armature, having a frame 11, a laminated core 12, an armature winding 13, and end-bells or end-shields 14. Mounted on the shaft 15 of the rotor is the spider 16, consisting of a hub 17, radial arms 18 and rim 19. Dove-tailed to the rim are a number of field-magnets 20, comprising poles 21, and coils 22. The field-poles, in this case, consist of laminæ which are held between end-plates 23. Each field-pole is provided with a dove-tail projection 24, engaging an undercut groove 25 of the rim and held securely in position by one or more holding-wedges or keys 26.

Secured to each side of the rim by bolts 27 are a number of segments 28 each consisting of an outer plate 29 and one or more inwardly extending, radial ribs, blades or projections 30. The outer plates are arranged end-to-end so as to form a continuous ring or shield around each side of the rim. The number of segments at each side of the rim and the number of ribs or blades on each segment may be varied as desired. As shown in Fig. 2 each segment has two ribs or blades. If desired the outer plates may be dispensed with or instead of each ring consisting of a number of plates it may consist of one continuous piece. The inwardly projecting ribs or members 30 are arranged opposite the field-magnets and the dove-tail projections, and engage the sides and inner surface of the rim, the rim being provided at each side with a groove or recess 31, and the blades with shoulders 32 adapted to fit in the grooves so that there will be less danger of displacement at high speeds. The outer portions of the inwardly projecting members are preferably provided with lateral extensions or supports 33 flush with the outer surface of the rim, upon which extensions or supports the outer or end portions of the coil-seats 34 which extend beyond the rim, rest. These supports 33 preferably extend across the entire width of the coil-seats, as is shown in Fig. 2, and preferably correspond in shape to the outer portions of the said coil-seats. Each radial member 30 is preferably provided with an enlarged portion 35 through which the holding bolts 27 pass, the plates being recessed to receive the heads of the bolts.

In Fig. 4 is shown a slightly modified form of the segments, the laterally extending supports 33ª upon which the outer ends of the coil-seats rest being shorter than the extensions 33 shown in Fig. 2. With this modification the space between two adjacent lateral supports is larger, so that the outward flow of air is less throttled.

In Figs. 5 and 6 is shown another slight modification. As here shown each segment 28ª has four inwardly extending members 30ª of a different shape than that shown in Figs. 1 to 4. Instead of the segments 28ª having narrow blades with lateral projections for supporting the ends of the coils, the segments as here shown have comparatively wide projecting members 30ª which as in the preceding case, create cooling air currents, retain the holding-wedges and field magnets in place and support the ends of the coil seats. Each member 30ª is preferably wider at the top or outer portion than at the bottom or inner portion, the outer portion being curved and extending substantially across the coil seat. The members 30ª are provided at the inner ends with shoulders 32ª adapted to engage grooves 31ª as in the structure first described. These members 30ª may be cored out if desired, to reduce their weight. As in the preceding case the members 30ª are each provided with a bolt hole and the segments are held in position by the bolts 27ª and shoulders 32ª.

It is seen that the inwardly extending members 30 or 30ª not only create air currents, but also lock or hold the keys or wedges in position, and prevent accidental displacement of the latter and of the field-magnets, and support the portions of the field-coils or coil-seats which extend beyond or on each side of the spider-rim. The segments, including the outer plates 29 and the portions extending inwardly therefrom, are preferably made of some light material so as not to add materially to the weight of the rim. If desired the outer plates 30 can be dispensed with but they are preferably employed as they guide the air upward into the stator core and around the stator coils, protect the blades, and add to the appearance of the machine.

A rotary field-member constructed according to our invention consists of fewer parts, is stronger and cheaper than the rotary field-members heretofore constructed, and materially increases the amount of air forced into the stator.

We do not desire to be confined to the exact details shown as many changes can be made without departing from the spirit and scope of our invention.

What we claim as new and desire to secure by Letters Patent is:—

1. In a dynamo-electric machine, a stationary armature, a rotary field-member comprising a spider having a rim, outwardly projecting field-magnets consisting of field poles and coils secured to said rim, and fan-segments secured to the sides of the rim, each segment comprising an outer plate and one or more radial blades engaging a side of the rim and having portions engaging and supporting ends of field-coils.

2. In a rotary field member of a dynamo-electric machine, a member having a rim, field magnets including coils and poles secured to the rim, portions of the coils overhanging the edges of the rim, and ventilating members secured to the sides of the rim, said members comprising outer flat plates spaced from the rim and radially disposed inwardly extending portions, said inwardly extending portions bearing against the sides of the rim opposite the field magnets and supporting the overhanging portions of the coils, and said plates being arranged end to end so as to form rings which guide the air outward.

3. In a rotary field member of a dynamo electric machine, a member having a rim, field magnets including coils and poles secured to the rim by dove-tail projections, wedges for holding the field magnets in place, and ventilating segments secured to the sides of the rim, each segment consisting of an outer flat plate spaced from the rim and one or more radially disposed inwardly projecting portions which bear against the side of the rim, said portions being located opposite the field magnets and the dove-tail projections and serving to retain the field magnets in place, and said plates being arranged end to end forming rings which conceal said inwardly projecting portions and guide the air outward.

4. In a rotary field member of a dynamo electric machine, a member having a rim, field magnets secured to the rim by dove-tail projections, wedges for holding the field magnets in place, and ventilating segments secured to the sides of the rim, each segment consisting of an outer flat plate which is spaced from the rim beyond the sides of the coils, and inwardly projecting fan blades, said fan blades engaging the side of the rim opposite the field magnets and having portions which retain the field magnets and holding wedges in place, and said plates being arranged end to end so as to form rings which conceal the blades and guide the air outward.

5. In a rotary field member of a dynamo electric machine, a member having a rim, field magnets including coils and poles secured to the rim, portions of the coils overhanging the edges of the rim, fan segments secured to the sides of the rim, each segment consisting of an outer flat plate and inwardly projecting fan blades which bear against the rim opposite the field magnets, the ends of the blades having laterally extending portions which bear against the overhanging portions of the corresponding field coils, and said plates being arranged end to end so as to form rings which conceal the blades and guide the air outward.

6. In a dynamo-electric machine, a rotary field-member comprising a spider having a rim, field-magnets consisting of field poles and coils secured to the rim by dove-tail projections, wedges or keys for holding the field-magnets in place, and a segmental ring secured to each side of the rim of the spider, said rings having outer flat plates which are spaced from the rim, and radially disposed inwardly projecting members which engage the rim and create a circulation of air between the plates and the rim, said members being located opposite the field magnets and having portions which support the ends of the field coils and prevent displacement of the field magnets.

7. In a dynamo-electric machine, a stationary armature, a rotary field-member comprising a spider having a rim, field-magnets consisting of field poles and coils secured to the rim by dove-tail projections, wedges for holding the field-magnets in place, and segmental rings secured to the sides of the rim of the spider, said rings having inwardly extending blades or ribs engaging the rim, said blades or ribs having portions arranged to support the outer portions of the field-coils and to prevent displacement of the field-magnet holding wedges.

8. In a dynamo-electric machine, a rotary field member comprising a spider having a rim, field-magnets consisting of field poles and coils secured to the rim by dove-tail projections, wedges for holding the field-magnets in place, and ventilating segments comprising outer plates arranged end-to-end around each side of the rim, and inwardly projecting ribs or blades engaging the sides of the rim opposite the dove-tail projections, and having portions which support the field-coils and hold the field-magnets and wedges in place.

9. In a dynamo-electric machine, a rotary field-member comprising a spider having a rim, field-magnets consisting of field poles and coils secured to the rim by dove-tail projections, wedges for holding the field-magnets in place, and a plurality of fan-segments arranged end-to-end around each side of the rim, each segment having one or more fan-blades, each fan-blade engaging the side of the rim, and a dove-tail projection and an end-portion of the corresponding field-coil.

10. In a dynamo electric machine, a rotary field member having a rim, field magnets consisting of field poles and coils secured to the rim by dove-tail projections, and radially arranged fan-blades bolted to the sides of the rim opposite the field magnets and having portions engaging the inner surface and the sides of the rim and laterally extending portions which bear against the inner ends of the field coils.

In testimony whereof we affix our signatures, in the presence of two witnesses.

BERNARD A. BEHREND.
EMIL MATTMAN.

Witnesses:
ARTHUR F. KWIS,
FRED J. KINSEY.